United States Patent [19]

Sawada et al.

[11] Patent Number: 4,896,417
[45] Date of Patent: Jan. 30, 1990

[54] METHOD OF PRODUCING A THIN FILM MAGNETIC HEAD

[75] Inventors: Shuichi Sawada; Atsushi Toyoda, both of Hamamatsu, Japan

[73] Assignee: Yamaha Corporation, Hamamatsu, Japan

[21] Appl. No.: 311,843

[22] Filed: Feb. 17, 1989

[30] Foreign Application Priority Data

Feb. 19, 1988 [JP] Japan .................................. 63-36648

[51] Int. Cl.$^4$ .............................................. G11B 5/42
[52] U.S. Cl. ..................................... 29/603; 360/125; 427/129
[58] Field of Search .................. 29/603; 427/127-131; 360/125-127, 123

[56] References Cited

U.S. PATENT DOCUMENTS

| | | | |
|---|---|---|---|
| 3,549,825 | 12/1970 | Trimble | 179/100.2 |
| 3,685,144 | 8/1972 | Trimble | 29/603 |
| 4,281,357 | 7/1981 | Lee | 360/125 |
| 4,489,105 | 12/1984 | Lee | 427/123 |

*Primary Examiner*—Carl E. Hall
*Attorney, Agent, or Firm*—Burns, Doane, Swecker & Mathis

[57] ABSTRACT

When writing data on a recording medium, a thin film magnetic head must concentrate its magnetic fluxes to a tip end of a pole thereof. For this reason, ineffective leakage magnetic fluxes to be outputted in the writing must be reduced as much as possible by desirably varying construction or formation of the thin film magnetic head. These magnetic fluxes are passed and converged through a lower layer core which is formed within a recess formed within a substrate of the thin film magnetic head. Through several experiments and study, it is proved that an average inclination angle at a side wall slope of the recess must be ranged from 15 degrees to 75 degrees. In order to form such recess, portions other than a portion at which the recess is to be formed on the substrate are covered by a patterned resist; the substrate is heated and the resist is partially flown so that the average inclination angle at the side edge portion of patterned resist will become equal to or smaller than 70 degrees; the recess is formed by an ion beam etching; and then remained resist is removed from the substrate. Thus, a smooth slope can be obtained at the edge of recess, by which the magnetic fluxes can be smoothly converged at the tip end of pole so that the recording can be performed with high recording density.

4 Claims, 10 Drawing Sheets

METHOD OF PRODUCING A THIN FILM MAGNETIC HEAD

BACKGROUND OF THE INVENTION

1. Field of the Invention

The present invention relates to a method of producing a thin film magnetic head, and more particularly to a method of producing a thin film magnetic head by which strong intensity of magnetic field for writing data on a magnetic recording medium can be obtained without generating excessive ineffective leakage magnetic flux.

2. Prior Art

FIG. 1 shows the sectional construction of the known thin film magnetic head which may be used in a magnetic recording apparatus. In FIG. 1, 1 designates a substrate on which an insulation layer 2 made of material such as $Al_2O_3$ is formed. In addition, a lower pole 3 made of soft magnetic materials is formed on the insulation layer 2 by the plating method, evaporation method or sputtering method. Then, an insulation layer 4 made of the material such as $Al_2O_3$ is formed as the film on the lower pole 3. Next, an insulation layer 5 made of organic substance such as photoresist is formed, and a coil 6 made of conductive material is further formed. In addition, another insulation layer 7 made of the organic substance such as the photoresist is formed in such a manner that the coil 6 is buried within this insulation layer 7. Thereafter, similar to the lower pole 3, an upper pole 8 made of the soft magnetic materials is formed. Lastly, a protection film 9 made of the insulation material such as $Al_2O_3$ is formed. The insulation layer 4 between the lower pole 3 and the upper pole 8 functions as a gap spacer, and the magnetic fluxes from an edge portion of these poles spaced with this gap spacer are used for writing data effectively.

In order to perform the recording with high bit density (e.g., the recording with the bit density of 2500 BPI (Bit Per Inch) or more) in the above-constructed thin film magnetic head, each film thickness of lower pole 3 and upper pole 8 must be set smaller than 1 $\mu$m (i.e., 1 micro-meter). In this case, the film thickness of soft magnetic material of each pole must be thin, so that its magnetic resistance must be increased. Hence, each of the lower pole 3 and upper pole 8 is saturated magnetically. For this reason, there is a disadvantage in that writing efficiency within writing and reading efficiency (i.e., R/W efficiency) of the thin film magnetic head is especially lowered so that writing characteristic of the thin film magnetic head must be deteriorated.

On the other hand, another conventional thin film magnetic head having the sectional construction as shown in FIG. 2 is also proposed. In FIGS. 2, 10 and 11 respectively designate a lower pole and an upper pole each of which is made of the soft magnetic materials, and 12 designates a substrate. In this head, the film thicknesses of these poles 10 and 11 at a inner gap portion B and read gap portion C are set larger as compared to the film thicknesses of these poles at a front gap portion A. Due to such construction, the magnetic resistances of lower pole 10 and upper pole 11 are lowered so that magnetic saturation of these poles can be restrained.

However, the above-constructed thin film magnetic head must have the following disadvantages. More specifically, since this head employs the step construction in that the film thickness of lower pole 10 becomes thicker in the opposite side of the substrate 12 (i.e., in the side of upper pole 11), the formation of each film piled on the lower pole 10 in the subsequent process and the formation of photoresist pattern by which these films are patterned must become difficult due to the stage difference made by this step construction. For this reason, the productivity of thin film magnetic head is lowered in its production process. In this case, the stage difference for the upper pole 11 must be larger as compared to that for the upper pole 8 in the thin film magnetic head having the sectional construction as shown in FIG. 1. Therefore, there is another disadvantage in that the magnetic characteristic of upper pole 11 is deteriorated in the inclination portion between the front gap portion A and the inner gap portion B.

Further, in the writing and reading period in the thin film magnetic head having the sectional construction as shown in FIG. 2, most of the magnetic fluxes are leaked in vain via a step portion D and then such leaked magnetic fluxes which are effective for the writing are flown in the direction from the upper pole 11 to the lower pole 10 or its reverse direction. Hence, the magnetic fluxes are not effectively passed through the upper pole 11 or lower pole 10, so that the R/W efficiency must be lowered.

In order to eliminate the above-mentioned disadvantages, still another magnetic head having the sectional construction as shown in FIG. 3 is proposed. In this magnetic head as shown in FIG. 3, a recess is formed at an insulation layer 20 in advance, and a first soft magnetic material layer 21 is formed such that the recess is buried within this layer 21. Then, a second soft magnetic material layer 22 having the predetermined pole formation is formed. Hence, a pile of such first layer 21 and second layer 22 forms the lower pole. Moreover, this magnetic head employs the reverse step construction in which the film thickness of lower pole at the inner gap portion B and rear gap portion C becomes thicker in the substrate side. Due to such reverse step construction as shown in FIG. 3, the disadvantages of the thin film magnetic heads as shown in FIGS. 1 and 2 can be eliminated.

Meanwhile, the recess within the above-mentioned thin film magnetic head as shown in FIG. 3 is formed by each of the following three methods each of which suffers its disadvantage to the contrary.

First method is as described in Japanese Patent Publication Laid-Open No. 60-193114 which employs the mechanical process using a brade, for example. By this first method as shown in FIG. 4, a recess is formed at a substrate 30 by the brade of dicer, and a lower magnetic layer 31 is provided at this recess or in the vicinity of this recess. On this layer 31, a non-magnetic insulation layer 32 which works as a gap length is piled. Then, a conductive layer 33 which forms a coil portion, its insulation layer 34 and upper magnetic layer 35 are sequentially formed. In addition, a protection layer 36 for protecting the main portion of thin film is provided, and a protection plate 37 is adhered to this protection layer 36. Thus, the thin film magnetic head is formed by the first method.

This first method uses the mechanical processing means, so that it is difficult to control the depth of recesses by micrometer order precision. In addition, it is also difficult for the first method to obtain the smooth cutting face. For these reasons, there is a disadvantage in that the magnetic characteristic of lower layer core must be deteriorated.

Next, second method is as described in Japanese Patent Publication Laid-Open No. 62-229512 which employs the wet etching method. In this second method, as shown in FIG. 5(a), a SiO2 film 41 of about 10 micrometers is formed on a substrate 40, and a resist 42 is subjected to the patterning in order to effect the etching for the recess. Then, the SiO2 film 41 is subjected to the wet etching by liquid of HF+HNO3 so that a recess 43 is formed as shown in FIG. 5(b).

According to this second method, the recess 43 has the reverse trapezoidal shape. However, due to the overflow of etching liquid, the side edge must be formed at the recess 43. For this reason, there is a disadvantage in that the smooth slopes of such trapezoid can not be obtained as shown in FIG. 5(b).

Next, third method employs the dry etching method. As shown in FIG. 6A, a resist 52 is subjected to the patterning on an insulation layer 51 formed on a substrate 50, and then the ion beam etching is performed by irradiating the ion beam thereon. Thus, a recess 53 is formed as shown in FIG. 6B.

In this case, the etching is applied to the resist 52 and insulation layer 51 simultaneously. Therefore, the exposing surface of insulation layer which is not covered by the resist 52 is directly subjected to the vertical etching so that the recess 53 is formed. For this reason, the recess 53 must have the sharp wall face as shown in FIG. 6B. Thereafter, as shown in FIG. 6C, a first soft magnetic material layer 54 is buried in the recess 53, and then a second soft magnetic material layer 55 is provided on the first layer 54 so that the the thin film magnetic head is formed in accordance with the third method. In such construction, the magnetic fluxes are passed through the lower pole constituted by the first layer 54 and second layer 55 and then the magnetic fluxes are sharp gathered at a narrow portion A, wherein the magnetic fluxes are saturated. Hence, the magnetic fluxes are diverged via portions B and D which are positioned in the vicinity of the narrow portion A. As a result, the density of magnetic fluxes which must be converged at a portion E must be thin as compared to the density of magnetic fluxes at the narrow portion A. Therefore, the restriction effect (or gathering effect) of magnetic fluxes can not be obtained. In addition, the magnetic fluxes which are leaked from the portions B and D and then broadly spread forms the leakage magnetic field which is applied to the medium surface so that the magnetic field for writing must be broadened. For this reason, recording density of the medium will not be increased.

SUMMARY OF THE INVENTION

It is accordingly a primary object of the present invention to provide a method of producing a thin film magnetic head in which the gathering effect of magnetic flux at its lower layer core is high.

It is another object of the present invention to provide a method of producing a thin film magnetic head whose magnetic fluxes for writing can be effectively converged so that the recording density of recording medium can be raised.

In an aspect of the present invention, there is provided a method of producing a thin film magnetic head comprising:

(a) a first process of covering a portion other than a portion at which a recess is to be formed on a substrate by a patterned resist;

(b) a second process of heating the substrate to thereby partially flowing the resist so that an average inclination angle at a side edge portion of patterned resist will become equal to or smaller than 70 degrees;

(c) a third process of forming the recess of the substrate by an ion beam etching; and (d) a fourth process of removing remained resist from the substrate.

BRIEF DESCRIPTION OF THE DRAWINGS

Further objects and advantages of the present invention will be apparent from the following description, reference being had to the accompanying drawings wherein preferred embodiment of the present invention is clearly shown.

In the drawings.

DESCRIPTION OF A PREFERRED EMBODIMENT

Principle of Present Invention

The present invention is provided through several experiments and study, from which the following result can be obtained.

At first, when the resist is masked and the recess is formed on the substrate by the ion beam etching, the resist is patterned (or positioned) on the substrate and then the substrate is properly heated so that the resist will be partially melted and flown away. Thus, the edge portion of patterned resist can be gradually inclined with ease. Thereafter, the ion beam etching is performed so that it is possible to obtain the recess whose side wall face is formed as the smooth slope.

Figure 8:
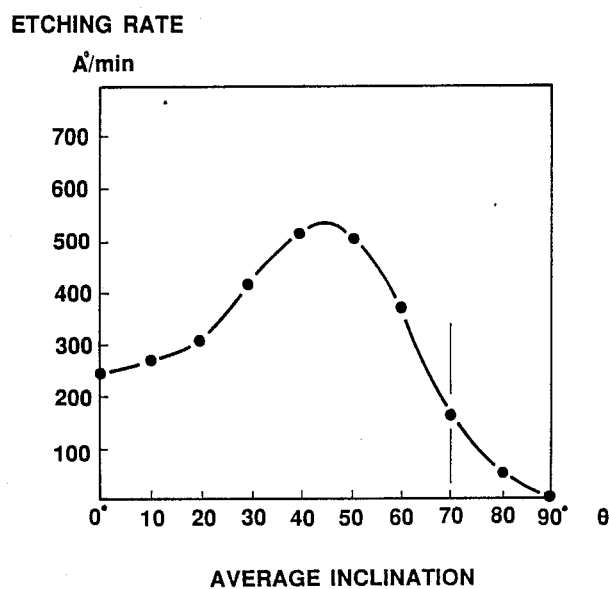
FIG. 8 is a graph showing the relation between average inclination and etching rate at an edge portion of patterning resist.

In order to obtain a proper inclination angle (i.e., average inclination) $\theta$ at the edge portion of resist by which the desirably formed recess can be obtained, the experiments and study are carried out on the relation between average inclination $\theta$ and etching rate. In this case, the experiment result as shown in FIG. 8 is obtained. It is apparent from FIG. 8 that the etching rate reaches at its peak value at $\theta = 40$ to 50 degrees but the etching rate is rapidly lowered at $\theta = 70$ degrees or more. This means that the etching is hardly performed on the edge face of resist which is risen sharp.

Figure 9:
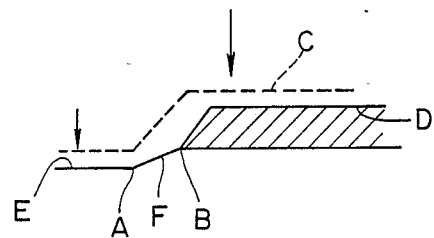
FIG. 9 shows an etching state when the recess is formed by the ion beam etching.
Figure 10:
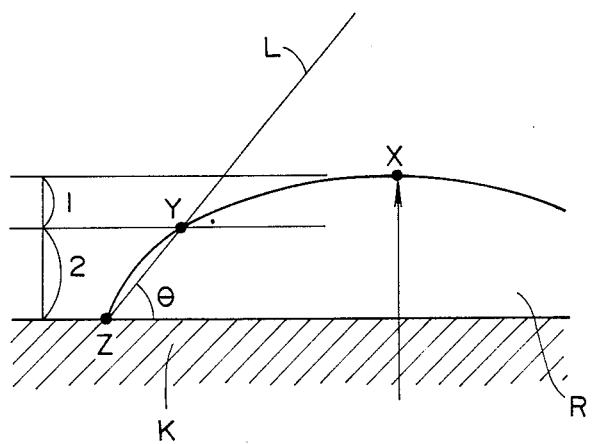
FIG. 10 is a view for explaining the average inclination at the edge portion of patterning resist.

More specifically, as shown in FIG. 9, since the inclined slope portion of resist whose average inclination $\theta = 70$ degrees or less is rapidly etched from the state indicated by C to the state indicated by D, the edge of masked portion is moved rightward from position A to position B. Therefore, an edge area E of recess is enlarged as shown by A and B in the lapse of time, while the side wall of recess is smoothed as shown by F.

Incidentally, the average inclination $\theta$ is defined as the angle formed between a line L and surface of substrate K at the maximum inclination section of the edge portion of resist R which has been heated and partially flown away. In this case, this line L is drawn between a point Y and another point Z which is positioned at the edge of resist R. This point Y is positioned at the ⅔ of height which is measured between the highest point X of resist R and surface of substrate K.

In order to prevent the magnetic fluxes from being leaked and also gather the magnetic fluxes, the proper inclination angle must be ranged from 15 degrees to 75 degrees.

As described above, according to the present invention, it is possible to form the recess having the smoothly inclined side wall face on the substrate with ease. By the inclined slope of recess forming the lower pole through which the magnetic field is passed, the magnetic fluxes are gradually gathered toward the tip edge of pole so that the maximum magnetic flux density can be obtained at this tip edge of pole. Thus, the intensity of magnetic field for writing can be increased. Due to the smoothed slope, the excessive leakage magnetic field which is ineffective for the writing can be reduced. Therefore, it is possible to improve the recording density of recording medium by the thin film magnetic head which is produced by the method according to the present invention.

Detailed Description of an Embodiment

Next, description will be given with respect to the method of producing the thin film magnetic head according to an embodiment of the present invention, which comprises the following processes (a) to (i).

Figure 1:
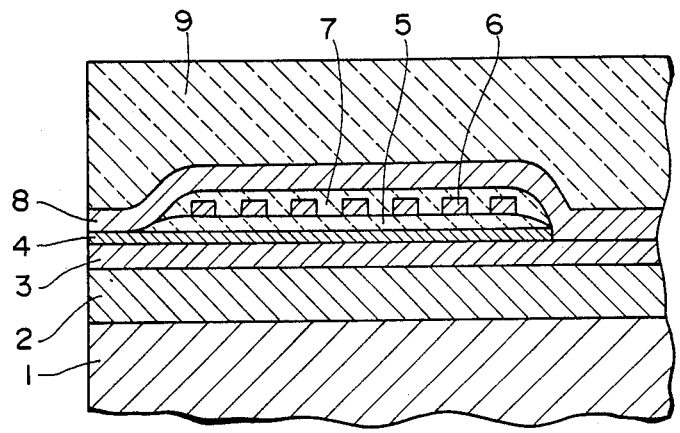
FIGS. 1 to 4 are sectional views each showing the sectional construction of conventional thin film magnetic head.
Figure 2:
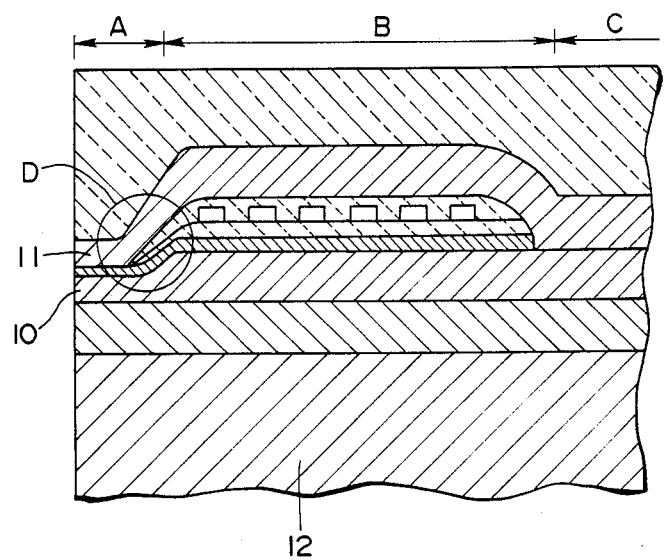
Figure 3:
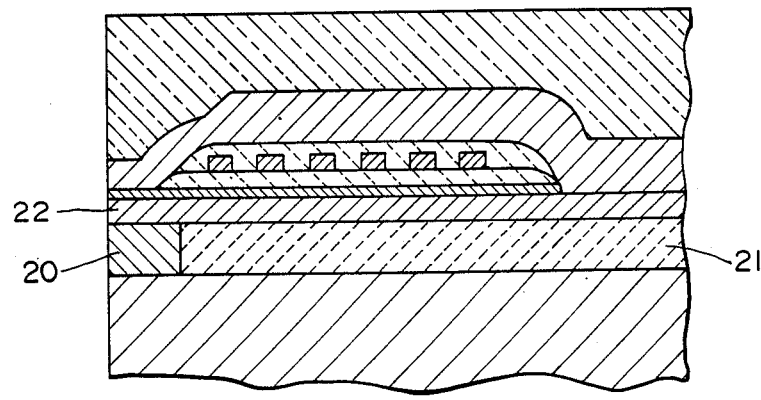
Figure 4:
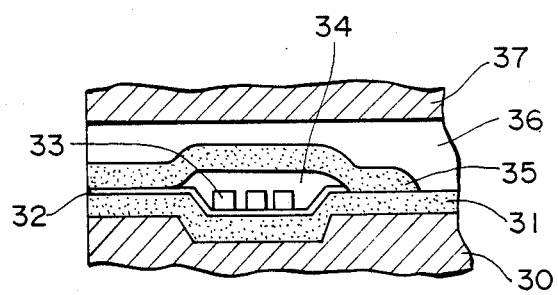
Figure 5:
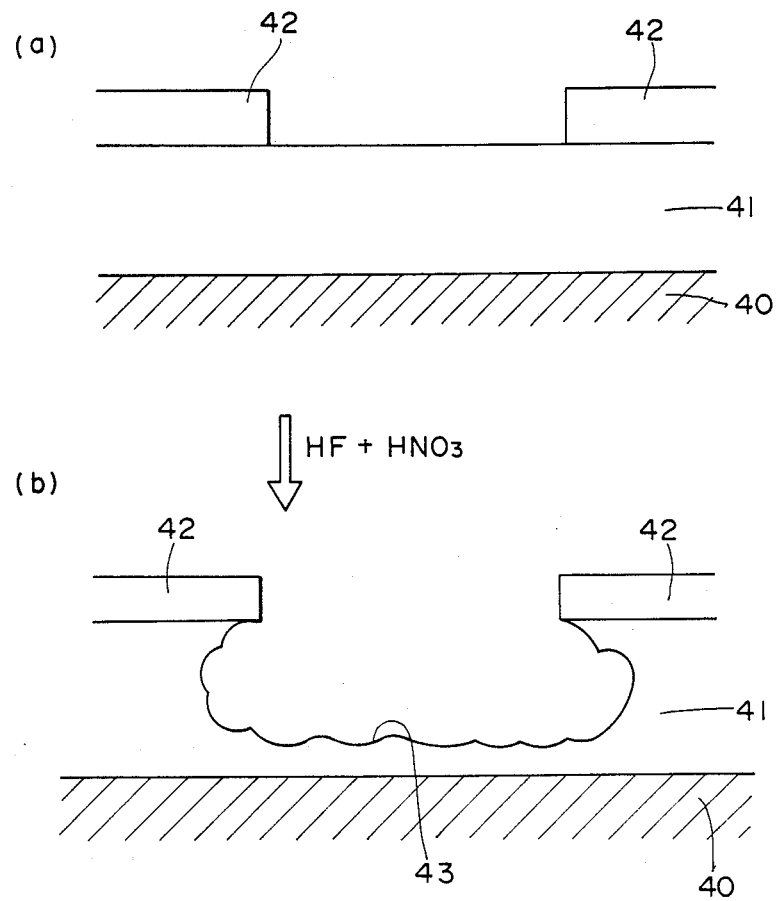
FIGS. 5(a) and 5(b) are sectional views showing the processes of forming the recess on the substrate by the wet etching method.
Figure 5:
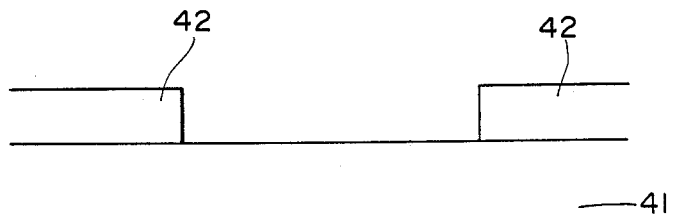
Figure 5:
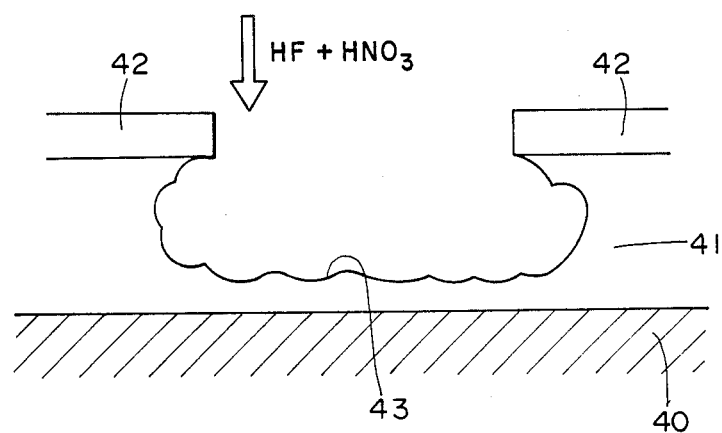
Figure 6A:
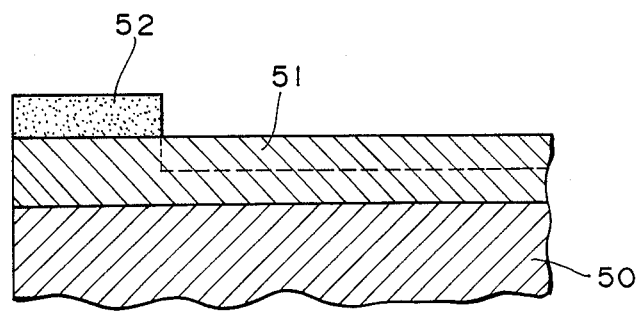
FIGS. 6A and 6B are sectional views showing the processes of forming the recess on the substrate by the ion beam etching method and FIG. 6C is a sectional view showing the thin film magnetic head in which the recess is formed by the ion beam etching method.
Figure 6B:
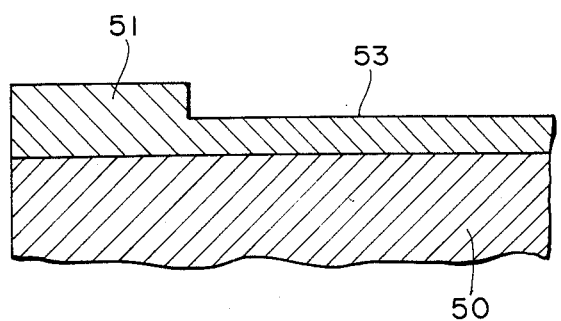
Figure 6C:
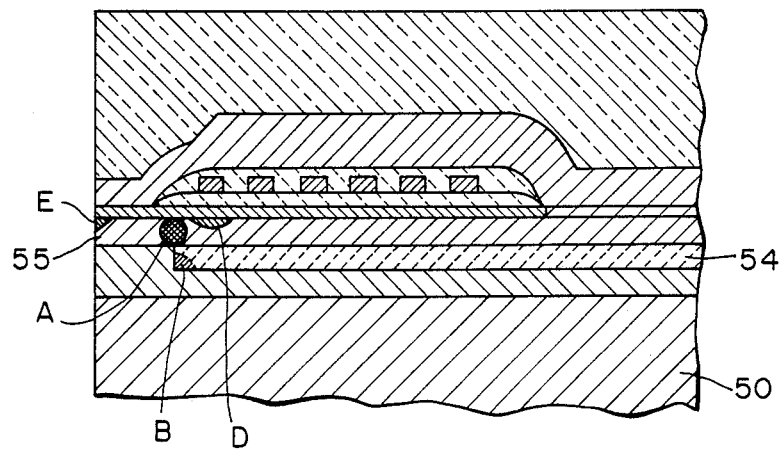
Figure 7A:
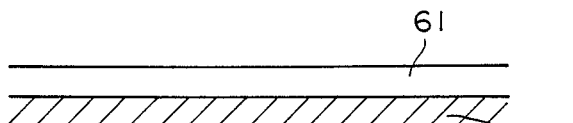
FIGS. 7A to 7I are sectional views showing the processes for producing the thin film magnetic head by the method according to an embodiment of the present invention.

(a) FIG. 7A: A resist 61 is spin-coated on a substrate 60.

Figure 7B:
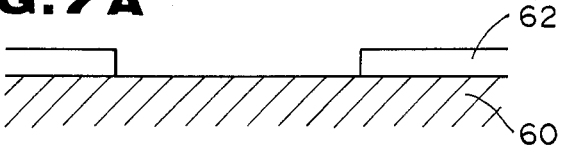

(b) FIG. 7B: Certain portion of resist at which the recess is to be formed on the substrate 60 is patterned and then removed so that a developing pattern is remained on the resist layer 62.

Figure 7C:
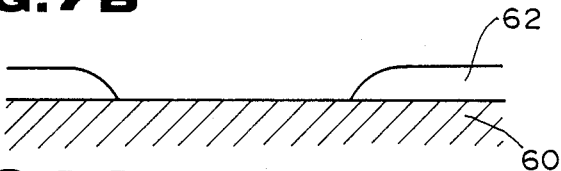

(c) FIG. 7C: The substrate 60 is heated so that the resist layer 62 is softened and partially flown away, whereby the average inclination angle at the edge portion of resist layer 62 will become equal to certain angle which is ranged from 20 degrees to 70 degrees.

Figure 7D:
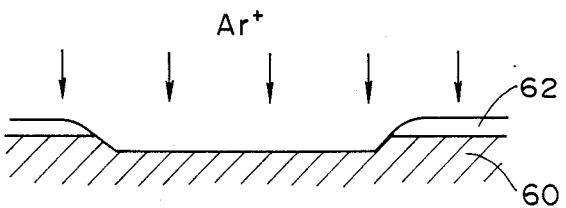

(d) FIG. 7D: Accelerated ion beam of Ar (Argon) is irradiated on the substrate 60 to thereby effect the etching (i.e., ion beam etching or ion milling).

Figure 7E:
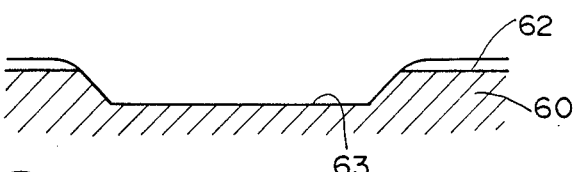

(e) FIG. 7E: A recess 63 having the predetermined scale is formed on the substrate 60.

Figure 7F:
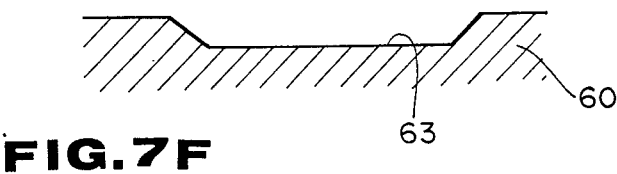

(f) FIG. 7F: The remained resist 62 is removed by resist release liquid and the like so that the substrate 60 having the recess 63 is obtained.

Figure 7G:
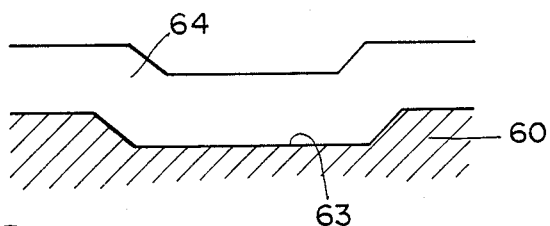

(g) FIG. 7G: The film of soft magnetic material is formed within the recess 63 by the sputtering, plating and the like so that a soft magnetic material layer 64 is obtained.

Figure 7H:
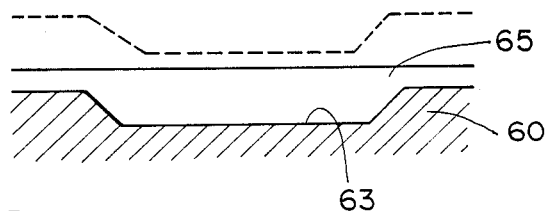

(h) FIG. 7H: The soft magnetic material layer 64 is partially removed by etching or mechanical polishing so that a soft magnetic material film (i.e., lower layer core) 65 with desirable thickness distribution for the magnetic fluxes is formed. Forming the surface of such film as a flat shape is one example (as shown in FIG. 7H).

Figure 7I:
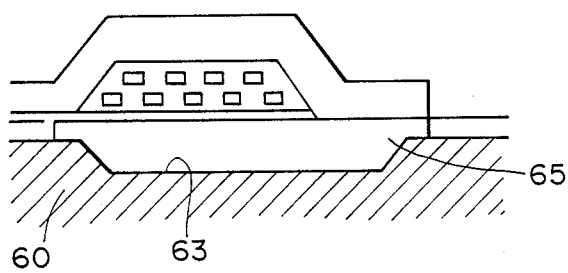

(i) FIG. 7I: The patterning is effected on the soft magnetic material film 65 in order to obtain the lower layer core shape. Thereafter, the thin film magnetic head will be produced in accordance with the known process.

Incidentally, the present embodiment adjusts the average inclination at the edge portion of resist layer 62 which is softened and partially flown away by heating the substrate 60 in the above-mentioned process (c). However, in order to deepen the recess and sharpen its side wall face, the recess must be reformed by repeatedly executing the processes (a) to (c) again after the recess is formed by the process (c).

Above is the description of a preferred embodiment. This invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A method of producing a thin film magnetic head comprising:
    (a) a first process step of covering a portion other than a portion at which a recess is to be formed on a substrate by a patterned resist;
    (b) a second process step of heating said substrate thereby partially flowing said resist so that an average inclination angle at a side edge portion of patterned resist will become equal to or smaller than 70 degrees;
    (c) a third process step of forming said recess of said substrate by an ion beam etching; and
    (d) a fourth process step of removing remaining resist from said substrate.

2. A method of producing a thin film magnetic head according to claim 1 wherein said recess has an inclined edge portion whose inclination angle is ranged from 15 degrees to 75 degrees in said third process step.

3. A method of producing a thin film magnetic head according to claim 1 wherein a lower layer core is buried within said recess formed on said substrate.

4. A method of producing a thin film magnetic head according to claim 1 further comprising:
    (a) a fifth process step of forming a film made of a soft magnetic material within said recess to thereby form a soft magnetic material layer;
    (b) a sixth process step of partially removing said soft magnetic material layer to thereby obtain a soft magnetic material film having a desirable thickness distribution; and
    (c) a seventh process step of patterning said soft magnetic material film so that a lower layer core is formed within said recess through which magnetic fluxes are gradually converged.

* * * * *

UNITED STATES PATENT AND TRADEMARK OFFICE
CERTIFICATE OF CORRECTION

PATENT NO. : 4,896,417

DATED : January 30, 1990

INVENTOR(S) : Shuichi SAWADA et al

It is certified that error appears in the above-identified patent and that said Letters Patent is hereby corrected as shown below:

--Column 1, line 39, change "2500 BPI" to --25000 BPI--;
 line 42, delete "must be set", and insert --is preferably set--.

Column 2, line 21, change "effective" to --ineffective--.

Column 3, line 13, delete "reverse";

line 14, change "overflow" to --effect--;

line 46, change "restriction effect" to --saturation--;

line 47, after "obtained", insert --at the portion A--.

Column 4, line 53, delete "away".

Column 5, line 13, delete "away";

line 49, delete "away".

Column 6, line 15, delete "away".--

Signed and Sealed this

Eleventh Day of December, 1990

*Attest:*

HARRY F. MANBECK, JR.

*Attesting Officer*    Commissioner of Patents and Trademarks